(12) United States Patent
Yoshida et al.

(10) Patent No.: US 7,949,040 B2
(45) Date of Patent: May 24, 2011

(54) RECEPTION QUALITY MEASURING APPARATUS AND RECEPTION QUALITY MEASURING METHOD

(75) Inventors: Shousei Yoshida, Tokyo (JP); Masayuki Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 562 days.

(21) Appl. No.: 12/153,001

(22) Filed: May 12, 2008

(65) Prior Publication Data

US 2008/0291990 A1     Nov. 27, 2008

(30) Foreign Application Priority Data

May 23, 2007   (JP) ................................. 2007-136588

(51) Int. Cl.
*H04B 3/46*     (2006.01)
*H04B 17/00*    (2006.01)
*H04Q 1/20*     (2006.01)

(52) U.S. Cl. ........ 375/227; 375/346; 375/350; 375/229; 455/63.1; 455/226.3; 455/296

(58) Field of Classification Search ................ 375/227, 375/346, 350, 229; 455/63.1, 226.3, 296
See application file for complete search history.

(56) References Cited

U.S. PATENT DOCUMENTS

| | | | | |
|---|---|---|---|---|
| 2005/0135460 A1* | 6/2005 | Akita | ............................. | 375/148 |
| 2005/0141598 A1* | 6/2005 | Akita | ............................. | 375/148 |
| 2006/0262869 A1* | 11/2006 | Yoshida | ........................ | 375/260 |
| 2008/0144708 A1* | 6/2008 | Tsuie et al. | .................... | 375/227 |

FOREIGN PATENT DOCUMENTS

| | | |
|---|---|---|
| GB | 2 431 825 | 5/2007 |
| JP | 9-219697 | 8/1997 |
| JP | 2002-368650 | 12/2002 |
| JP | 2004-180154 | 6/2004 |

(Continued)

OTHER PUBLICATIONS

British Search Report dated Sep. 29, 2008.

*Primary Examiner* — Phuong Phu
(74) *Attorney, Agent, or Firm* — McGinn IP Law Group, PLLC

(57) ABSTRACT

A reception quality measuring apparatus of the present invention comprises a first sub-carrier averaging unit for averaging and outputting a channel gain after equalization estimated on the basis of the pilot signal over a sub-carrier, a first power calculation unit for calculating the power of a signal output from the first sub-carrier averaging unit and outputting the same as signal power, a pilot replica generator for generating and outputting a pilot signal replica with respect to a zero-timing signal component based on the zero-timing signal component when a signal x(n) in the time domain after equalization corresponding to the equalized signal is n=0, and also based on a previously set pilot code characteristic, a subtractor for subtracting the pilot signal replica output from the pilot replica generator from the equalized signal and outputting the result as an interference signal, a second power calculation unit for calculating and outputting the power of the interference signal output from the subtractor, a second sub-carrier averaging unit for averaging the power output from the second power calculation unit over the sub-carrier and outputting the result as interference power, and a divider for dividing the signal power output from the first power calculation unit by the interference power output from the second sub-carrier averaging unit to calculate a reception quality after equalization.

12 Claims, 6 Drawing Sheets

FOREIGN PATENT DOCUMENTS

| | | |
|---|---|---|
| JP | 2005-57673 | 3/2005 |
| JP | 2005-102271 | 4/2005 |
| JP | 2006-164487 | 6/2006 |
| JP | 2006-287754 | 10/2006 |
| WO | WO 02/28122 A2 | 4/2002 |
| WO | WO 03/041300 A1 | 5/2003 |
| WO | WO 2004/047348 A1 | 6/2004 |
| WO | 2005/064807 | 7/2005 |

* cited by examiner

RECEPTION QUALITY MEASURING APPARATUS AND RECEPTION QUALITY MEASURING METHOD

This application is based upon and claims the benefit of priority from Japanese patent application No. 2007-136588, filed on May 23, 2007, the disclosure of which is incorporated herein in its entirety by reference.

BACKGROUND OF THE INVENTION

1. Field of the Invention

The present invention relates to a reception quality measuring apparatus and a reception quality measuring method for measuring the reception quality of a single carrier signal in a mobile communication system, and more particularly, to a reception quality measuring apparatus and a reception quality measuring method which convert a pilot signal included in a single carrier signal from a signal in a time domain to a signal in a frequency domain, and measure the reception quality of the single carrier signal based on an equalized signal after equalization is performed.

2. Description of the Related Art

In an uplink radio system of next-generation mobile communications, a single-carrier (SC) system is regarded as promising for expanding communication areas because of its low peak to average power ratio (PAPR).

Also, in the next-generation mobile communications, the reception quality must be measured at a base station in order to perform scheduling, adaptive modulation and coding (AMC), and transmit power control (TPC) of packet signals. As the reception quality, generally, a signal to interference power ratio (SIR) is measured using a pilot signal (see, for example, Patent Documents 1, 2). Here, the interference power includes noise power.

Patent Document 1: JP-2005-057673-A
Patent Document 2: JP-2006-287754-A

In the SC system, in order to restrain inter-symbol interference (multi-path interference) due to multi-paths, multi-path equalization must be performed at a receiver. As the multi-path equalization, frequency domain equalization, which requires a less amount of processing, is performed.

When the frequency domain equalization is performed in a receiver, SIR differs before equalization and after equalization, and SIR after equalization reflects the correct reception quality. SIR before equalization indicates set SIR independently of multi-path transmission paths, whereas SIR after equalization reflects the influence of the multi-path transmission paths and equalization processing, so that as multi-path conditions become more strict (as the number of paths increases), SIR deteriorates due to noise amplification caused by the equalization and residual multi-path interference. Accordingly, when measured SIR is used for AMC modulation scheme and coding rate selection and TPC, more correct control can be conducted using SIR after equalization.

In the past, SIR after equalization of the SC system is measured in a time domain after an equalized signal in a frequency domain is inverse discrete Fourier transformed (IDFT) for conversion to a signal in the time domain, so that the amount of processing is increased in order to obtain inverse discrete Fourier transformation of the equalized signal of the pilot signal. In order to reduce the amount of processing for IDFT, SIR is preferably measured in the frequency domain.

FIG. 1 shows an exemplary configuration of a receiver for demodulating an SC signal. This receiver measures SIR before equalization or SIR after equalization of the SC signal in the frequency domain.

The receiver shown in FIG. 1 comprises reception antenna 1, CP (Cyclic Prefix) remover 2, discrete Fourier Transform (DFT) unit 3, reception filter 4, channel estimator 5, weight calculation unit 6, frequency domain equalizer 7, IDFT unit 8, and reception quality measuring apparatus 9.

Reception antenna 1 receives the SC signal as a reception signal. FIGS. 2A and 2B show an example of a format for the SC signal.

Upon transmitting a data signal, as shown in FIG. 2A, a data signal is transmitted together with a pilot signal associated therewith for demodulation in the same band as the data signal. The data signal is processed by reception antenna 1, CP remover 2, DFT unit 3, reception filter 4, frequency domain equalizer 7, and IDFT unit 8, and is output as a demodulated signal. The pilot signal for demodulation is processed by reception antenna 1, CP remover 2, DFT unit 3, and reception filter 4, and is applied to channel estimator 5, frequency domain equalizer 7, and reception quality measuring apparatus 9. Specifically, upon transmitting the data signal, reception quality measuring apparatus 9 measures SIR before equalization using the output of channel estimator 5 or the output of reception filter 4, or measures SIR after equalization using equalization weight found based on an estimate of channel gain by weight calculation unit 6, and also based on the output of frequency domain equalizer 7.

On the other hand, when no data signal is transmitted, as shown in FIG. 2B, a pilot signal for probing in an arbitrary band is transmitted at a predetermined period. The pilot signal for probing is processed by reception antenna 1, CP remover 2, DFT unit 3, and reception filter 4, and applied to channel estimator 5 and reception quality measuring apparatus 9. Specifically, when no data signal is transmitted, reception quality measuring apparatus 9 measures SIR before equalization using the output of channel estimator 5 and the output of reception filter 4.

CP remover 2 removes a signal of a portion corresponding to CP from an SC signal received by reception antenna 1.

DFT unit 3 performs DFT of the signal output from CP remover 2 at $N_{DFT}$ points ($N_{DFT}$ is an integer equal to or larger than two) for conversion to a signal in a frequency domain.

Reception filter 4 limits the band of the signal in the frequency domain output from DFT unit 3 to perform user separation and noise suppression. In this regard, while a raised cosine roll off filter is generally used for reception filter 4, a sub-carrier corresponding to the signal band may be selected (demapped) when the roll off rate is zero.

Channel estimator 5 performs correlation processing of the pilot signal in the frequency domain output from reception filter 4 and a pilot reference signal to find a correlation signal (channel gain before noise suppression), and further performs noise suppression to estimate the channel gain. When a pilot code having fixed amplitude characteristics is used in this correlation processing, channel gain H'(k) ($1 \leq k \leq K$, where K is the number of sub-carriers in the signal band), before the noise suppression, is represented by the following Equation (1):

[Equation (1)]

$$H'(k) = R(k)C^*(k) \quad (1)$$

where R(k) is a reception signal in the frequency domain ($1 \leq k \leq K$), and C(k) is the pilot coding characteristic ($1 \leq k \leq K$).

Accordingly, channel estimator 5 performs the noise suppression for the foregoing H'(k) to find channel gain H(k).

Weight calculation unit 6 calculates an equalization weight based on the channel gain output from channel estimator 5. As a weight calculation method, a zero forcing method (ZF), or a minimum mean squared error method (MMSE) is used.

Frequency domain equalizer 7 multiplies an equalization weight output from weight calculation unit 6 by a signal in the frequency domain output from reception filter 4 on a sub-carrier by sub-carrier basis to perform multi-path equalization for the reception signal in the frequency domain.

IDFT unit 8 performs IDFT at $N_{IDFT}$ points ($N_{IDFT}$ is an integer equal to or larger than two) for the equalized signal in the frequency domain output from frequency domain equalizer 7 for conversion to a signal in the time domain, and outputs a demodulated signal.

Reception quality measuring apparatus 9 measures SIR before equalization or measures SIR after equalization in the frequency domain using the output of reception filter 4 or the output of frequency domain equalizer 7.

FIG. 3 shows an exemplary configuration of a conventional reception quality measuring apparatus which is incorporated in the receiver shown in FIG. 1 as reception quality measuring apparatus 9. This reception quality measuring apparatus measures SIR before equalization.

The conventional reception quality measuring apparatus shown in FIG. 3 comprises first power calculation unit 112, first sub-carrier averaging unit 113, pilot signal replica generator 114, subtractor 115, second power calculation unit 116, second sub-carrier averaging unit 117, and divider 118.

In the following, a description will be given of the operation of the conventional reception quality measuring apparatus shown in FIG. 3.

First, first power calculating unit 112 calculates the power of channel gain H(k) in the frequency region found in channel estimator 5 in order to find signal power S. First sub-carrier averaging unit 113 averages the power of channel gain H(k) calculated by first power calculating unit 112 by the number K of sub-carriers to find signal power S. Signal power S is represented by the following Equation (2):

[Equation (2)]
$$S = \frac{1}{K}\sum_{k=1}^{K} |H(k)|^2 \qquad (2)$$

Next, pilot replica generator 114 generates pilot signal replica H(k)C(k) from channel gain H(k) and pilot code characteristic C(k) in order to find interference power I. Here, pilot code characteristic C(k) has been previously set in the reception quality measuring apparatus. Subtractor 115 subtracts pilot signal replica H(k)C(k) generated by pilot replica generator 114 from DFT signal R(k) in the frequency domain output from reception filter 4 to output an interference signal. Second power calculation unit 116 calculates the power of the interference signal output from subtractor 115. Second sub-carrier averaging unit 117 averages the power of the interference signal calculated by second power calculation unit 116 by the number K of sub-carriers to find interference power I. Interference power I is represented by the following Equation (3):

[Equation (3)]
$$I = \frac{1}{K}\sum_{k=1}^{K} |R(k) - H(k)C(k)|^2 \qquad (3)$$

Interference power I can also be found by using channel gain H'(k) before noise suppression instead of reception signal R(k) in Equation (3) and using channel gain H(k) instead of pilot signal replica H(k)C(k). In this event, interference power I is represented by the following Equation (4):

[Equation (4)]
$$I = \frac{1}{K}\sum_{k=1}^{K} |H'(k) - H(k)|^2 \qquad (4)$$

The principle of SIR measurement by Equation (4) is similar to Equation (3).

Subsequently, divider 118 divides signal power S found by first sub-carrier averaging unit 113 by interference power I found by second sub-carrier averaging unit 117 to calculate SIR before equalization.

FIG. 4 shows an exemplary configuration of a conventional reception quality measuring apparatus which is incorporated in the receiver shown in FIG. 1 as reception quality measuring apparatus 9. This reception quality measuring apparatus measures SIR after equalization.

The conventional reception quality measuring apparatus shown in FIG. 4 comprises multiplier 111, first power calculation unit 112, first sub-carrier averaging unit 113, pilot signal replica generator 114, subtractor 115, second power calculation unit 116, second sub-carrier averaging unit 117, and divider 118. As compared with the reception quality measuring apparatus shown in FIG. 3, this reception quality measuring apparatus uses a similar measuring principle though different inputs are used in the calculation of signal power S and interference power I.

In the following, a description will be given of the operation of the conventional reception quality measuring apparatus shown in FIG. 4.

First, multiplier 111 multiplies channel gain H(k) found by channel estimator 5 by equalization weight W(k) ($1 \leq k \leq K$) found by weight calculation unit 6 to find channel gain W(k)H(k) after equalization in order to find signal power S. First power calculation unit 112 calculates the power of channel gain W(k)H(k) after equalization found by multiplier 111. First sub-carrier averaging unit 113 averages the power of channel gain W(k)H(k) after equalization found by first power calculation unit 112 by the number K of sub-carriers to find signal power S. Signal power S is represented by the following Equation (5):

[Equation (5)]
$$S = \frac{1}{K}\sum_{k=1}^{K} |W(k)H(k)|^2 \qquad (5)$$

Next, pilot replica generator 114 generates pilot signal replica W(k)H(k)C(k) from channel gain W(k)H(k) after equalization and pilot code characteristic C(k) in order to find interference power I. Here, pilot code characteristic C(k) has been previously set in the reception quality measuring apparatus. Subtractor 115 subtracts pilot signal replica $W(k)H(k)C(k)$ generated by pilot replica generator 114 from equalized signal $R_{EQ}(k)$ ($1 \leq k \leq K$) in the frequency domain output from frequency domain equalizer 7 to output an interference signal. Second power calculation unit 116 calculates the power of the interference signal output from subtractor 115. Second sub-carrier averaging unit 117 averages the power of the interference signal calculated by second power calculation unit 116 by the number K of sub-carriers to find interference power I. Interference power I is represented by the following Equation (6):

[Equation (6)]
$$I = \frac{1}{K}\sum_{k=1}^{K} |R_{EQ}(k) - W(k)H(k)C(k)|^2 \tag{6}$$

Interference power I can also be found by using channel gain $W(k)H'(k)$ after equalization before noise suppression instead of Equalized signal $R_{EQ}(k)$ in Equation (6), and by using channel gain $W(k)H(k)$ after equalization instead of pilot signal replica $W(k)H(k)C(k)$. In this event, interference power I is represented by the following Equation (7):

[Equation (7)]
$$I = \frac{1}{K}\sum_{k=1}^{K} |W(k)H'(k) - W(k)H(k)|^2 \tag{7}$$

The principle of SIR measurement by Equation (7) is similar to Equation (6).

Subsequently, divider 118 divides signal power S found by first sub-carrier averaging unit 113 by interference power I found by second sub-carrier averaging unit 117 to calculate SIR after equalization.

However, the conventional reception quality measuring apparatus has the following challenges when it is used in the measurement of SIR after equalization as shown in FIG. 4, though no particular problems arise when it is used in the measurement of SIR before equalization as shown in FIG. 3.

Equalized signal $R_{EQ}(k)$ includes an equalized signal component of its own signal, a residual multi-path component, and other interference (noise and other user interference).

However, the conventional reception quality measuring apparatus shown in FIG. 4 subtracts its own signal, including the residual multi-path component from equalized signal $R_{EQ}(k)$, as represented by Equation (6), so that interference power I alone contains other interference (noise and other user interference).

Stated another way, since the conventional reception quality measuring apparatus shown in FIG. 4 regards the residual multi-path interference as signal power S, SIR that is higher than actual SIR after equalization is measured in a low SIR region, resulting in a degradation in the measurement accuracy of SIR after equalization.

SUMMARY OF THE INVENTION

It is therefore an object of the present invention to provide a reception quality measuring apparatus and a reception quality measuring method which are capable of measuring SIR after equalization of an SC signal in a frequency domain with high accuracy in a simple manner.

To solve the above problem, a reception quality measuring apparatus of the present invention is a reception quality measuring apparatus which converts a pilot signal included in a single carrier signal from a signal in a time domain to a signal in a frequency domain, and measures a reception quality of the single carrier signal based on an equalized signal after equalization is performed. The apparatus is characterized by comprising:

a first sub-carrier averaging unit for averaging and outputting a channel gain after equalization estimated on the basis of the pilot signal over a sub-carrier;

a first power calculation unit for calculating the power of a signal output from the first sub-carrier averaging unit and outputting the same as signal power;

a pilot replica generator for generating and outputting a pilot signal replica with respect to a zero-timing signal component based on the zero-timing signal component when a signal x(n) in the time domain after equalization corresponding to the equalized signal is n=0, and also based on a previously set pilot code characteristic;

a subtractor for subtracting the pilot signal replica output from the pilot replica generator from the equalized signal and outputting the result as an interference signal;

a second power calculation, unit for calculating and outputting the power of the interference signal output from the subtractor;

a second sub-carrier averaging unit for averaging the power output from the second power calculation unit over the sub-carrier and outputting the result as interference power; and a divider for dividing the signal power output from the first power calculation unit by the interference power output from the second sub-carrier averaging unit to calculate a reception quality after equalization.

To solve the above problem, a reception quality measuring method of the present invention is a reception quality measuring method by a reception quality measuring apparatus which converts a pilot signal included in a single carrier signal from a signal in a time domain to a signal in a frequency domain, and measures a reception quality of the single carrier signal based on an equalized signal after equalization is performed. The method is characterized by comprising the steps of:

averaging a channel gain after equalization estimated on the basis of the pilot signal over a sub-carrier;

calculating the power of a signal output from the first sub-carrier averaging unit to find signal power;

generating a pilot signal replica with respect to a zero-timing signal component based on the zero-timing signal component when a signal x(n) in the time domain after equalization corresponding to the equalized signal is n=0, and also based on a previously set pilot code characteristic;

subtracting the pilot signal replica from the equalized signal to generate an interference signal;

calculating the power of the interference signal;

averaging the power of the interference signal over the sub-carrier to find interference power; and dividing the signal power by the interference power to calculate a reception quality after equalization.

According to the reception quality measuring apparatus and reception quality measuring method of the present invention, the signal power after equalization is regarded as solely having a zero-timing signal component in the time domain. In this way, the reception quality after equalization can be measured in a simple manner. Also, signal components at other timings are regarded as an interference signals on the assumption that they are residual multi-path interference components. In this way, the reception quality after equalization can be measured with high accuracy taking into consideration residual multi-path interference. Consequently, the reception quality after equalization can be advantageously measured in a simple manner with high accuracy.

The above and other objects, features, and advantages of the present invention will become apparent from the following description with reference to the accompanying drawings which illustrate examples of the present invention.

DESCRIPTION OF THE PREFERRED EMBODIMENTS

In the following, the best mode for carrying out the present invention will be described with reference to the drawings.

First Exemplary Embodiment

Figure 5:
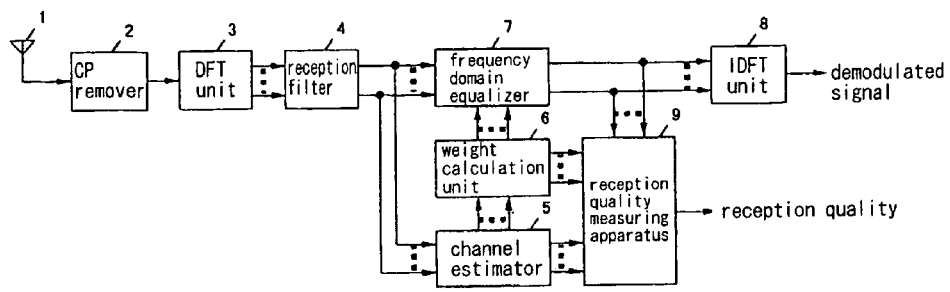
FIG. 5 is a block diagram showing an exemplary configuration of a receiver for demodulating a signal carrier signal.

FIG. 5 shows an exemplary configuration of a receiver for demodulating an SC signal. This receiver measures SIR after equalization of the SC signal in the frequency domain.

Figure 1:
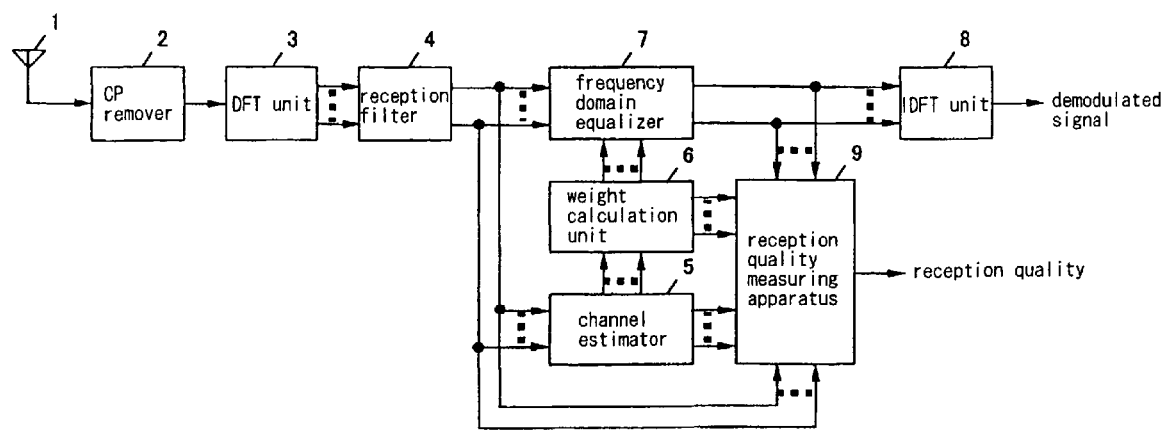
FIG. 1 is a block diagram showing the configuration of a receiver for demodulating a single carrier signal.

The receiver shown in FIG. 5 comprises reception antenna 1, CP remover 2, discrete Fourier Transform unit 3, reception filter 4, channel estimator 5, weight calculation unit 6, frequency domain equalizer 7, IDFT unit 8, and reception quality measuring apparatus 9. Since this receiver does not measure SIR before equalization, it differs from the receiver shown in FIG. 1 in that an input from reception filter 4 to reception quality measuring apparatus 9 is removed.

Reception antenna 1 receives the SC signal as a reception signal.

CP remover 2 removes a signal of a portion corresponding to CP from an SC signal received by reception antenna 1.

DFT unit 3 performs DFT of the signal output from CP remover 2 at $N_{DFT}$ points ($N_{DFT}$ is an integer equal to or larger than two) for conversion to a signal in a frequency domain.

Reception filter 4 limits the band of the signal in the frequency domain output from DFT unit 3 to perform user separation and noise suppression. In this regard, while a raised cosine roll off filter is generally used for reception filter 4, a sub-carrier corresponding to the signal band may be selected (demapped) when the roll off rate is zero.

Channel estimator 5 performs correlation processing of the pilot signal in the frequency domain output from reception filter 4 and of a pilot reference signal to find a correlation signal (channel gain before noise suppression), and further performs noise suppression to estimate the channel gain. When a pilot code of fixed amplitude characteristic is used in this correlation processing, channel gain H'(k) ($1 \leq k \leq K$, where K is the number of sub-carriers in the signal band) before the noise suppression is represented by the aforementioned Equation (1), where R(k) is a reception signal in the frequency domain ($1 \leq k \leq K$), and C(k) is the pilot coding characteristic ($1 \leq k \leq K$). Accordingly, channel estimator 5 performs the noise suppression for the foregoing H'(k) to find channel gain H(k).

Weight calculation unit 6 calculates an equalization weight based on the channel gain output from channel estimator 5. As a weight calculation method, a zero forcing method, or a minimum mean squared error method is used.

Frequency domain equalizer 7 multiplies an equalization weight output from weight calculation unit 6 by a signal in the frequency domain output from reception filter 4 on a sub-carrier by sub-carrier basis to perform multi-path equalization for the reception signal in the frequency domain.

IDFT unit 8 performs IDFT at $N_{IDFT}$ points ($N_{IDFT}$ is an integer equal to or larger than two) for the equalized signal in the frequency domain output from frequency domain equalizer 7 for conversion to a signal in the time domain, and outputs a demodulated signal.

Reception quality measuring apparatus 9 measures SIR after equalization in the frequency domain using the output of frequency domain equalizer 7.

Figure 6:
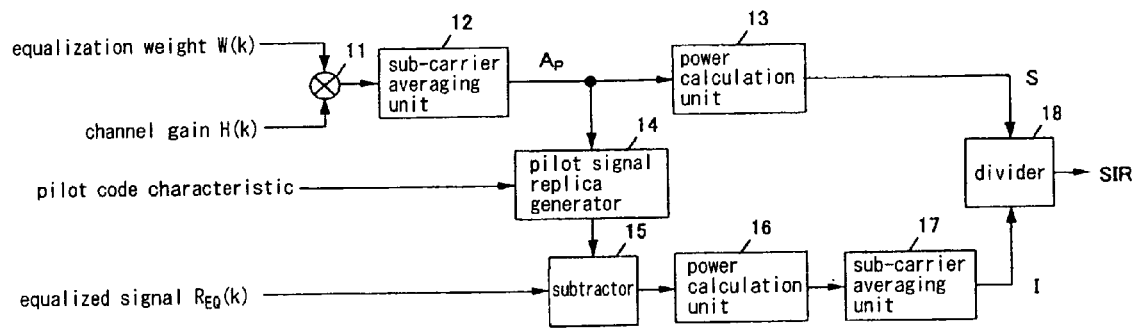
FIG. 6 is a block diagram showing an exemplary configuration of a reception quality measuring apparatus according to a first exemplary embodiment of the present invention.

FIG. 6 shows an exemplary configuration of a reception quality measuring apparatus of this exemplary embodiment which is incorporated in the receiver shown in FIG. 5 as reception quality measuring apparatus 9. This reception quality measuring apparatus measures SIR after equalization.

Figure 2A:
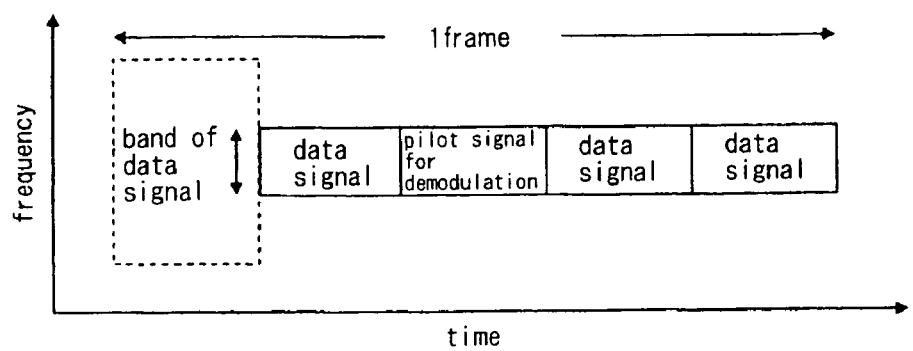
FIG. 2A is a diagram showing an example of a format for a single carrier signal when a data signal is transmitted.

The reception quality measuring apparatus of this exemplary embodiment shown in FIG. 6 comprises multiplier 11, first sub-carrier averaging unit 12, first power calculation unit 13, pilot signal replica generator 14, subtractor 15, second power calculation unit 16, second sub-carrier averaging unit 17, and divider 18. This reception quality measuring apparatus measures SIR after equalization using a pilot signal for demodulation (see FIG. 2A) applied through reception antenna 1, CP remover 2, DFT unit 3, reception filter 4, and frequency domain equalizer 7. SIR after equalization is used in scheduling of data signals, in AMC, and in TPC control.

The reception quality measuring apparatus of this exemplary embodiment is characterized in that signal power S after equalization is regarded as solely having a zero-timing signal component when signal x(n) in the time domain corresponding to an equalized signal is n=0. In this way, SIR after equalization can be measured in a simple manner. In addition, by regarding signal components at other timings as interference signal I on the assumption that they are residual multi-path interference components, SIR after equalization can be measured with high accuracy taking into consideration residual multi-path interference.

Signal X(k) in the frequency domain can be converted to signal x(n) in the time domain by inverse discrete Fourier Transform (IDFT), as represented by the following Equation (8):

[Equation (8)]

$$x(n) = \frac{1}{N}\sum_{k=0}^{N-1} X(k)e^{j\frac{2\pi kn}{N}} \quad (8)$$

Here, zero-timing signal component x(0), when signal x(n) in the time domain is n=0, is the average of signal X(k) in the frequency domain, as represented by the following Equation (9):

[Equation (9)]

$$x(0) = \frac{1}{N}\sum_{k=0}^{N-1} X(k)e^{j\frac{2\pi k 0}{N}} \quad (9)$$
$$= \frac{1}{N}\sum_{k=0}^{N-1} X(k)$$

Since an equalized signal component contains only a zero-timing signal component, when considered in the time domain, residual multi-path interference components will not be regarded as signal power S, as has been done before, if signal power S after equalization is regarded as solely having a zero-timing signal component in the time domain, which is the equalized signal component.

In the following, a description will be given of the operation of the reception quality measuring apparatus of this exemplary embodiment.

First, multiplier 11 multiplies channel gain H(k) found by channel estimator 5 by equalization weight W(k) found by weight calculation unit 6 to find channel gain W(k)H(k) after equalization in order to find signal power S. First sub-carrier averaging unit 12 averages channel gain W(k)H(k) after equalization found by multiplier 11 by the number K of sub-carriers. First power calculation unit 13 calculates the power of the output of first sub-carrier averaging unit 12 to find signal power S. Signal power S is represented by the following Equation (10):

[Equation (10)]

$$S = \left(\frac{1}{K}\sum_{k=1}^{K} W(k)H(k)\right)^2 = A_P^2 \quad (10)$$

Considering that X(k) in Equation (9) is channel gain W(k)H(k) after equalization, as shown in Equation (10), $A_p$ is the average of W(k)H(k). In other words, in Equation (10), signal power S after equalization is regarded as solely having zero-timing signal component $A_p$ in the time domain. Also, taking into consideration the time domain, other timing signal components x(n) (n=1-(N-1)) are residual multi-path interference components. Also, zero-timing signal component $A_p$ after equalization is definitely a real number without fail.

Next, pilot replica generator 14 generates pilot signal replica $A_pC(k)$ with respect to zero-timing signal component $A_p$ from zero-timing signal component $A_p$ after equalization and pilot code characteristic C(k) in order to find interference power I. Here, pilot code characteristic C(k) has been previously set in the reception quality measuring apparatus. Subtractor 15 subtracts pilot signal replica $A_pC(k)$ generated by pilot replica generator 14 from equalized signal $R_{EQ}(k)$ in the frequency domain output from frequency domain equalizer 7 to output an interference signal. Second power calculation unit 16 calculates the power of the interference signal output from subtractor 15. Second sub-carrier averaging unit 17 averages the power of the interference signal calculated by second d power calculation unit 16 by the number K of sub-carriers to find interference power I. Interference power I is represented by the following Equation (11):

[Equation (11)]

$$I = \frac{1}{K}\sum_{k=1}^{K} |R_{EQ}(k) - A_P C(k)|^2 \quad (11)$$

In Equation (11), the equalized signal component of its own signal is simply subtracted from $R_{EQ}(k)$. Thus, interference power I is residual multi-path components of its own signal and other kinds of interference (noise and other user interference).

Figure 4:
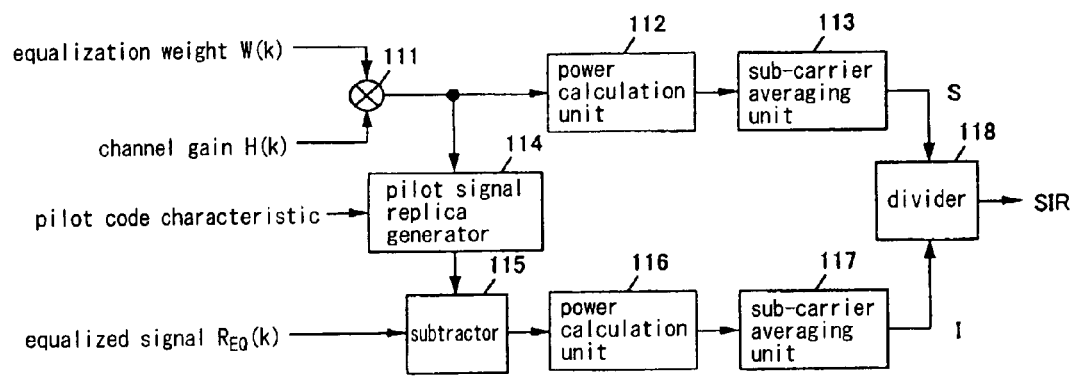
FIG. 4 is a block diagram showing the configuration of a conventional reception quality measuring apparatus for measuring SIR after equalization.

In this way, in the reception quality measuring apparatus of this exemplary embodiment, as represented by Equation (10) and Equation (11), the residual multi-path interference components, which have been regarded as signal power S in the conventional reception quality measuring apparatus shown in FIG. 4, are regarded as interference power I.

Interference power I can also be found by using channel gain W(k)H'(k) after equalization before noise suppression instead of Equalized signal $R_{EQ}(k)$ in Equation (11), and by using zero-timing signal component $A_p$ instead of pilot signal replica $A_pC(k)$. In this event, interference power I is represented by the following Equation (12):

[Equation (12)]

$$I = \frac{1}{K}\sum_{k=1}^{K} |W(k)H'(k) - A_P|^2 \quad (12)$$

The principle of SIR measurement by Equation (12) is similar to Equation (11).

Subsequently, divider 18 divides signal power S found by first sub-carrier averaging unit 13 by interference power I found by second sub-carrier averaging unit 17 to calculate SIR after equalization.

Figure 7:
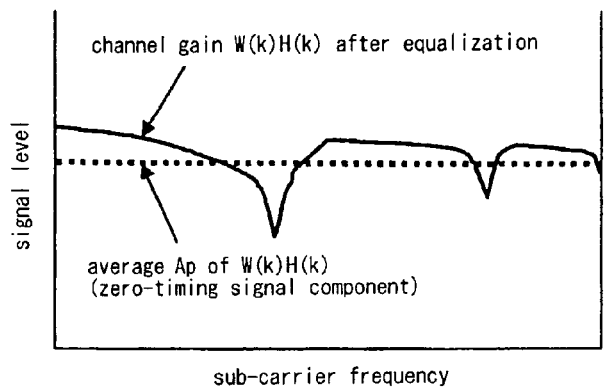
FIG. 7 is a diagram for describing the principle of measuring SIR after equalization in a frequency domain.

FIG. 7 shows the principle of measuring SIR after equalization in the frequency domain.

As shown in FIG. 7, the average of channel gain W(k)H(k) after equalization is comparable to zero-timing signal component $A_p$ in the time domain. Also, the square of the difference between W(k)H(k) and $A_p$ is regarded as a residual multipath component.

Figure 8:
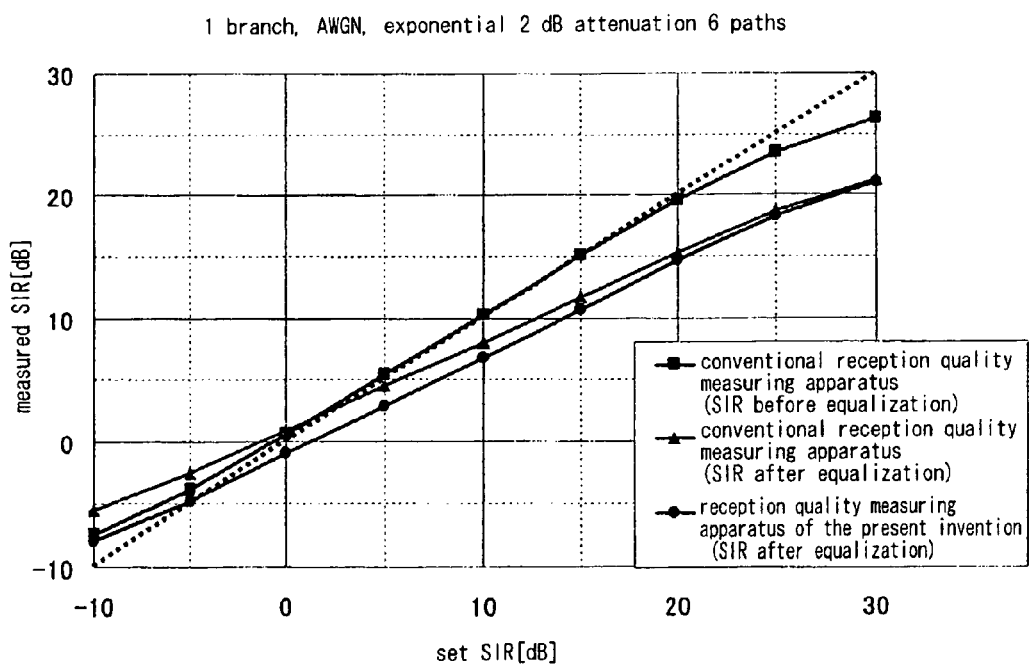
FIG. 8 is a diagram showing the SIR measurement characteristic of the reception quality measuring apparatus of the present invention.

FIG. 8 shows the SIR measurement characteristic of the reception quality measuring apparatus of this exemplary embodiment.

Causes for errors in measured SIR include noise amplification through equalization and the influence of residual multi-path interference.

Figure 3:
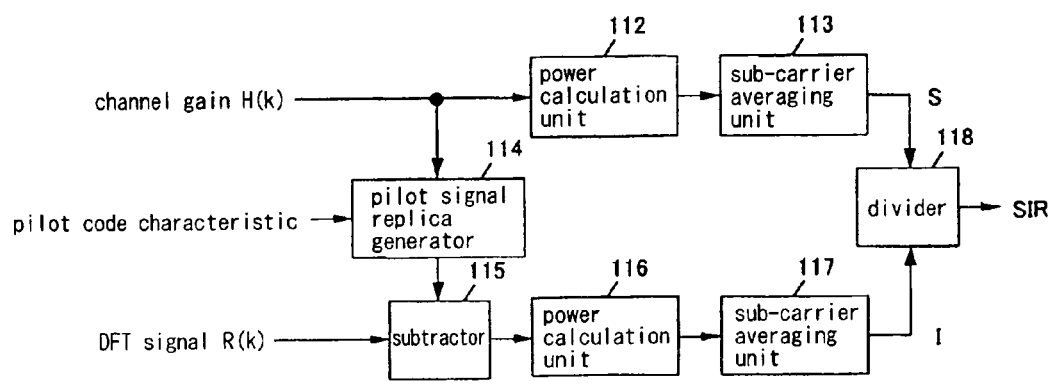
FIG. 3 is a block diagram showing the configuration of a conventional reception quality measuring apparatus for measuring SIR before equalization.

As shown in FIG. 8, in the conventional reception quality measuring apparatus for measuring SIR before equalization shown in FIG. 3, measured SIR is higher than actual SIR after SIR in a high SIR region because it does not consider noise amplification through equalization.

However, the problem of noise amplification can be solved by simply measuring SIR after equalization. SIR's after equalization measured by the conventional reception signal measuring apparatus shown in FIG. 4 and by the reception quality measuring apparatus of this exemplary embodiment shown in FIG. 6 are smaller as compared with measured SIR before equalization in the high SIR region, and substantially match in characteristic. From this fact, it is understood that the problem of noise amplification has been solved by the conventional reception quality measuring apparatus shown in FIG. 4.

However, in the conventional reception quality measuring apparatus shown in FIG. 4, the residual multi-path components are not regarded as interference power I but as signal power S, as represented by Equation (2) and Equation (3), so that higher SIR is measured than actual SIR after equalization in a low SIR region.

In contrast, in the reception quality measuring apparatus shown in FIG. 6, the residual multi-path components are not regarded as signal power S but as interference power I, as represented by Equation (10) and Equation (11).

In this way, the reception quality measuring apparatus of this exemplary embodiment shown in FIG. 6 considers not only the influence of noise amplification through equalization with the aid of SIR measurement after equalization, but also residual multi-path interference with the aid of the calculations of Equation (10) and Equation (11), and can therefore measure SIR after equalization of an SC signal in the frequency domain in a simple manner with high accuracy.

Second Exemplary Embodiment

Figure 9:
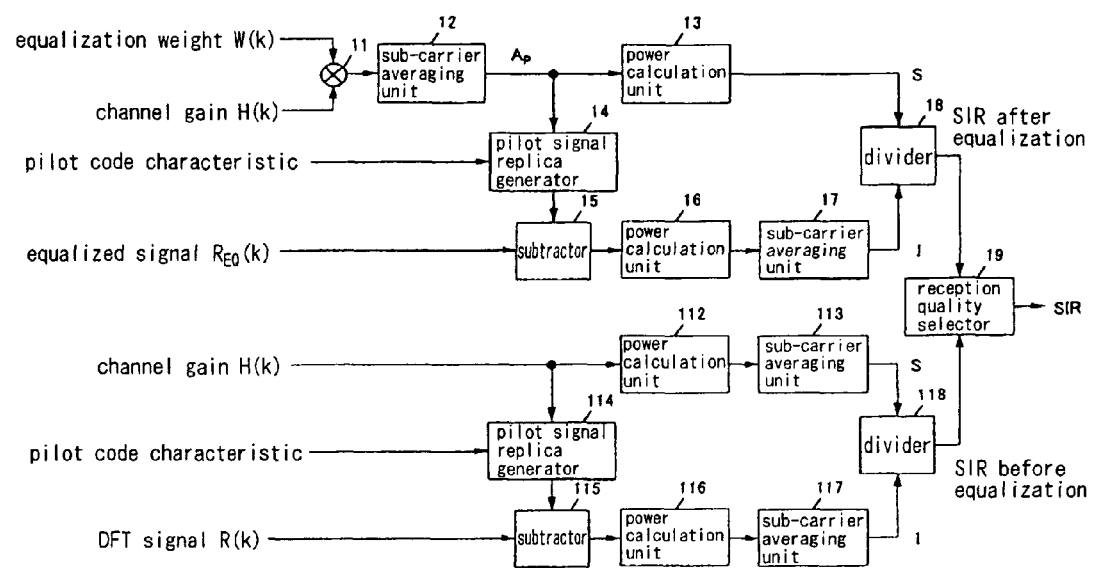
FIG. 9 is a block diagram showing an exemplary configuration of a reception quality measuring apparatus according to a second exemplary embodiment of the present invention.

FIG. 9 shows an exemplary configuration of a reception quality measuring apparatus of this exemplary embodiment.

Since the reception quality measuring apparatus of the first exemplary embodiment measures SIR after equalization using a pilot signal for demodulation which is transmitted in association with a data signal, SIR can be basically measured only when the data signal is transmitted. Accordingly, since SIR is not measured when the first data signal is transmitted or when data signals are not transmitted for some time, scheduling, AMC, TPC control cannot be performed.

Thus, the reception quality measuring apparatus of this exemplary embodiment is configured to measure SIR before equalization in addition to the measurement of SIR after equalization. This reception quality measuring apparatus is incorporated in the receiver shown in FIG. 1 as reception quality measuring apparatus 9.

Figure 2B:
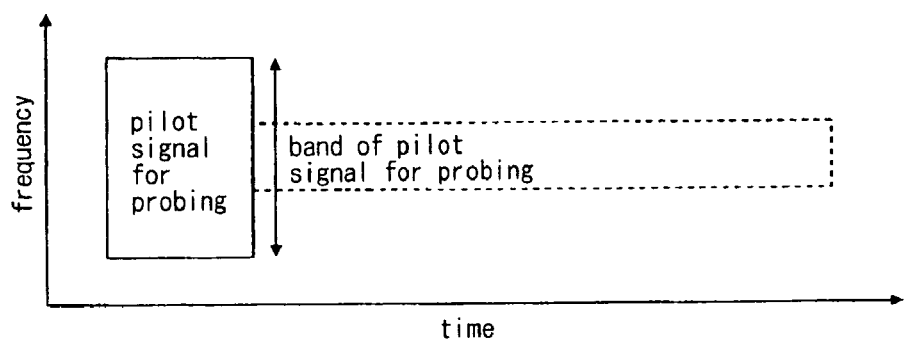
FIG. 2B is a diagram showing an example of a format for a single carrier signal when no data signal is transmitted.

The reception quality measuring apparatus of this exemplary embodiment shown in FIG. 9 comprises, as a post-equalization reception quality measuring unit, multiplier 11, first sub-carrier averaging unit 12, first power calculation unit 13, pilot signal replica generator 14, subtractor 15, second power calculation unit 16, second sub-carrier averaging unit 17, and divider 18, shown in FIG. 6. Also, the reception quality measuring apparatus of this exemplary embodiment comprises, as a pre-equalization reception quality measuring unit, first power calculation unit 112, first sub-carrier averaging unit 113, pilot signal replica generator 114, subtractor 115, second power calculation unit 116, second sub-carrier averaging unit 117, and divider 118, shown in FIG. 3. Further, the reception quality measuring apparatus of this exemplary embodiment comprises reception quality selector 19 for selectively outputting SIR before equalization measured by the pre-equalization reception quality measuring unit or SIR after equalization measured by the post-equalization reception quality measuring unit. Post-equalization reception quality measuring unit measures SIR after equalization using a pilot signal for demodulation (see FIG. 2A) which is applied through reception antenna 1, CP remover 2, DFT unit 3, reception filter 4, and frequency domain equalizer 7. On the other hand, post-equalization reception quality measuring unit measures SIR using the pilot signal for demodulation which is applied through reception antenna 1, CP remover 2, DFT unit 3, and reception filter 4, or a pilot signal for probing (see FIG. 2B). SIR's before and after equalization are used for scheduling of data signals, for AMC, and for TCP control.

Reception quality selector 19 preferentially outputs SIR after equalization when SIR after equalization is measured more recently than SIR before equalization, and when SIR before equalization and SIR after equalization are measured at the same time.

Also, reception quality selector 19 preferentially outputs SIR after equalization until a predetermined time elapses from the measurement of SIR after equalization.

Also, reception quality selector 19 stores the difference between most recently measured SIR before equalization and SIR after equalization, corrects SIR before equalization using the difference, and preferentially outputs the corrected SIR.

In the first and second exemplary embodiment, the conversion from a signal in the time domain to a signal in the frequency domain relies on DFT, while the conversion from a signal in the frequency domain to a signal in the time domain relies on IDFT, but fast Fourier transform (FFT), inverse fast Fourier transform (IFFT), or other transform algorithms may be employed instead.

While this invention has been particularly shown and described with reference to exemplary embodiments thereof, this invention is not limited to these embodiments. It will be understood by those of ordinary skill in the art that various changes in form and details may be made therein without departing from the spirit and scope of the present invention as defined by the claims.

What is claimed is:

1. A reception quality measuring apparatus which converts a pilot signal included in a single carrier signal from a signal in a time domain to a signal in a frequency domain, and measures reception quality of the single carrier signal based on an equalized signal after equalization is performed, said apparatus comprising:
a first sub-carrier averaging unit for averaging and outputting a channel gain after equalization that is estimated on the basis of the pilot signal over a sub-carrier;
a first power calculation unit for calculating the power of a signal output from said first sub-carrier averaging unit and outputting the same as signal power;
a pilot replica generator for generating and outputting a pilot signal replica with respect to a zero-timing signal component after equalization based on a signal output from said first sub-carrier averaging unit, and also based on a pilot code characteristic;
a subtractor for subtracting the pilot signal replica output from said pilot replica generator from the equalized signal and outputting the result as an interference signal;
a second power calculation unit for calculating and outputting the power of the interference signal output from said subtractor;
a second sub-carrier averaging unit for averaging the power output from said second power calculation unit over the sub-carrier and outputting the result as interference power; and
a divider for dividing the signal power output from said first power calculation unit by the interference power output from said second sub-carrier averaging unit to calculate reception quality after equalization.

2. The reception quality measuring apparatus according to claim 1, wherein:
said pilot replica generator is excluded, and
said subtractor subtracts the zero-timing signal component after equalization from the channel gain after equalization before noise suppression to calculate the interference signal.

3. The reception quality measuring apparatus according to claim 1, wherein said pilot signal used in the measurement of the reception quality after equalization is a pilot signal for demodulation in the same bandwidth as a data signal, which is associatively transmitted when the data signal is transmitted.

4. The reception quality measuring apparatus according to claim 1, wherein said reception quality after equalization is used in the scheduling of a data signal, adaptive modulation/coding, and transmission power control.

5. The reception quality measuring apparatus according to claim 1, comprising:
a post-equalization reception quality measuring unit including said first sub-carrier averaging unit, said first power calculation unit, said pilot replica generator, said subtractor, said second power calculation unit, said second sub-carrier averaging unit, and said divider, for measuring the reception quality after equalization;
a pre-equalization signal quality measuring unit for measuring reception quality before equalization; and
a reception quality selector for selecting and outputting the reception quality before equalization has been measured in said pre-equalization reception quality measuring unit or for selecting and outputting the reception quality after equalization has been measured in said post-equalization reception quality measuring unit.

6. The reception quality measuring apparatus according to claim 5, wherein:
said pilot signal used in the measurement of the reception quality after equalization is a pilot signal for demodulation in the same band as a data signal, which is associatively transmitted when the data signal is transmitted, and
said pilot signal used in the measurement of the reception quality before equalization is the pilot signal for demodulation, or is a pilot signal for probing in an arbitrary band, which is transmitted at a predetermined period when the data signal is not transmitted.

7. The reception quality measuring apparatus according to claim 5, wherein said reception quality before equalization and said reception quality after equalization are used in scheduling of a data signal, adaptive modulation/coding, and transmission power control.

8. The reception quality measuring apparatus according to claim 7, wherein said reception quality selector preferentially outputs the reception quality after equalization when the reception quality after equalization is measured more recently than the reception quality before equalization, and when the reception quality before equalization and the reception quality after equalization are measured at the same time.

9. The reception quality measuring apparatus according to claim 7, wherein said reception quality selector preferentially outputs the reception quality after equalization until a predetermined time elapses from the measurement of the reception quality after equalization.

10. The reception quality measuring apparatus according to claim 7, wherein said reception quality selector stores a difference between the reception quality before equalization and the reception quality after equalization measured at the same time, corrects the reception quality before equalization using the difference, and preferentially outputs the corrected reception quality.

11. A reception quality measuring method by a reception quality measuring apparatus which converts a pilot signal included in a single carrier signal from a signal in a time domain to a signal in a frequency domain, and measures a reception quality of the single carrier signal based on an equalized signal after equalization is performed, said method comprising the steps of:
averaging a channel gain after equalization that is estimated on the basis of the pilot signal over a sub-carrier;
calculating the power of a signal output from said first sub-carrier averaging unit to find signal power;
generating a pilot signal replica with respect to a zero-timing signal component based on the zero-timing signal component when a signal x(n) in the time domain after equalization corresponding to the equalized signal is n=0, and also based on a previously set pilot code characteristic;
subtracting the pilot signal replica from the equalized signal to generate an interference signal;
calculating the power of the interference signal;
averaging the power of the interference signal over the sub-carrier to find interference power; and
dividing the signal power by the interference power to calculate a reception quality after equalization.

12. A reception quality measuring apparatus which converts a pilot signal included in a single carrier signal from a signal in a time domain to a signal in a frequency domain, and measures a reception quality of the single carrier signal based on an equalized signal after equalization is performed, said apparatus comprising:
first sub-carrier averaging means for averaging and outputting a channel gain after equalization that is estimated on the basis of the pilot signal over a sub-carrier;
first power calculating means for calculating the power of a signal output from said first sub-carrier averaging means and outputting the same as signal power;
pilot replica generating means for generating and outputting a pilot signal replica with respect to a zero-timing signal component after equalization based on a signal output from said first sub-carrier averaging means, and also based on a pilot code characteristic;
subtracting means for subtracting the pilot signal replica output from said pilot replica generating means from the equalized signal and outputting the result as an interference signal;
second power calculating means for calculating and outputting the power of the interference signal output from said subtracting means;
second sub-carrier averaging means for averaging the power output from said second power calculating means over the sub-carrier and outputting the result as interference power; and
dividing means for dividing the signal power output from said first power calculating means by the interference power output from said second sub-carrier averaging means to calculate a reception quality after equalization.

* * * * *